(12) United States Patent
Riley

(10) Patent No.: US 7,309,421 B2
(45) Date of Patent: Dec. 18, 2007

(54) FLOATING SKIMMER FOR CLEANING THE SURFACE OF A BODY OF LIQUID

(75) Inventor: Louis F Riley, Weston, FL (US)

(73) Assignee: Weston Consumor Products, Inc., Weston, FL (US)

(*) Notice: Subject to any disclaimer, the term of this patent is extended or adjusted under 35 U.S.C. 154(b) by 46 days.

(21) Appl. No.: 11/306,604

(22) Filed: Jan. 4, 2006

(65) Prior Publication Data

US 2007/0151913 A1    Jul. 5, 2007

(51) Int. Cl.
E04H 4/16 (2006.01)

(52) U.S. Cl. .................. 210/167.2; 210/241.1

(58) Field of Classification Search ............... 210/122, 210/540, 167.1, 167.2, 242.1
See application file for complete search history.

(56) References Cited

U.S. PATENT DOCUMENTS

| | | | |
|---|---|---|---|
| 3,767,055 A * | 10/1973 | Flatland | 210/242.1 |
| 3,860,518 A * | 1/1975 | Henricksen | 210/242.1 |
| 3,970,556 A | 7/1976 | Gore | |
| 4,746,424 A | 5/1988 | Drew | |
| 4,828,803 A | 5/1989 | Nicholson et al. | |
| 4,900,432 A * | 2/1990 | Arnold et al. | 210/167.1 |
| 5,106,492 A * | 4/1992 | Distinti et al. | 210/167.2 |
| 5,128,031 A * | 7/1992 | Midkiff | 210/242.1 |
| 5,269,913 A | 12/1993 | Atkins | |
| 5,662,795 A | 9/1997 | Pickens et al. | |
| 6,013,178 A | 1/2000 | Strano et al. | |
| 6,074,553 A * | 6/2000 | Haski | 210/167.2 |
| 2003/0201218 A1 * | 10/2003 | Henkin et al. | 210/169 |

* cited by examiner

*Primary Examiner*—Christopher Upton

(57) ABSTRACT

A skimmer device for cleaning the surface of a body of liquid having a housing with a front and rear opening. Disposed within the housing is at least one float, a removable tray, and a battery powered motor with an attached propeller. Attached to the exterior of the housing is a guide fin and a net.

10 Claims, 4 Drawing Sheets

FLOATING SKIMMER FOR CLEANING THE SURFACE OF A BODY OF LIQUID

BACKGROUND OF THE INVENTION

This invention is directed to a device for cleaning the surface of a body of liquid. Leaves and other floating debris are commonly removed from swimming pools by "skimmers" built into the walls of the pool at the normal water level. Wave action in the pool washes floating leaves and debris into troughs or openings in the wall of the pool where they are drawn by a line connected to the suction side of the swimming pool pump. This system is less than satisfactory as some leaves are blown against the wall of the pool remote from the skimmer. The water level also fluctuates below the position of the skimmer causing the skimmer to be inoperative.

Floating skimmers have been used to overcome these problems, but these devices are complex, requiring many parts, are difficult to assemble, and expensive to manufacture. Therefore, a need exists in the art for a skimmer that addresses these problems.

An objective of this invention is to provide a skimmer having fewer parts that is easier to assemble.

Another objective of this invention is to provide a skimmer that is more economical to manufacture.

These and other objectives will be apparent to those skilled in the art based on the following written description.

SUMMARY OF THE INVENTION

A skimmer device for cleaning the surface of a body of liquid having a housing with a front and rear opening. Disposed within the housing is at least one float, a removable tray, and a battery powered motor with an attached propeller. Attached to the exterior of the housing is a guide fin and a net.

DETAILED DESCRIPTION OF THE PREFERRED EMBODIMENT

Figure 1:
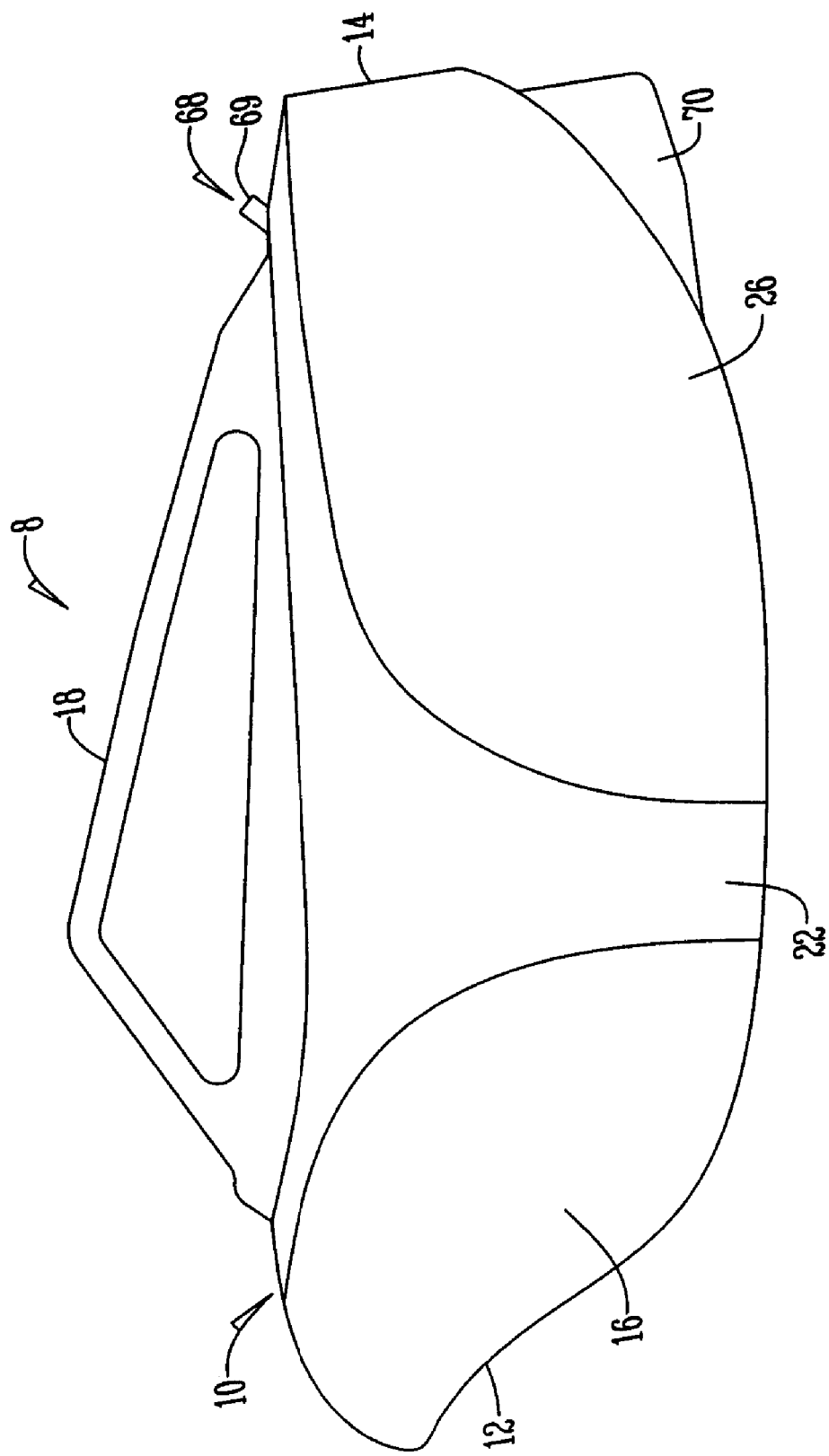
FIG. 1 is a side view of a skimmer.
Figure 2:
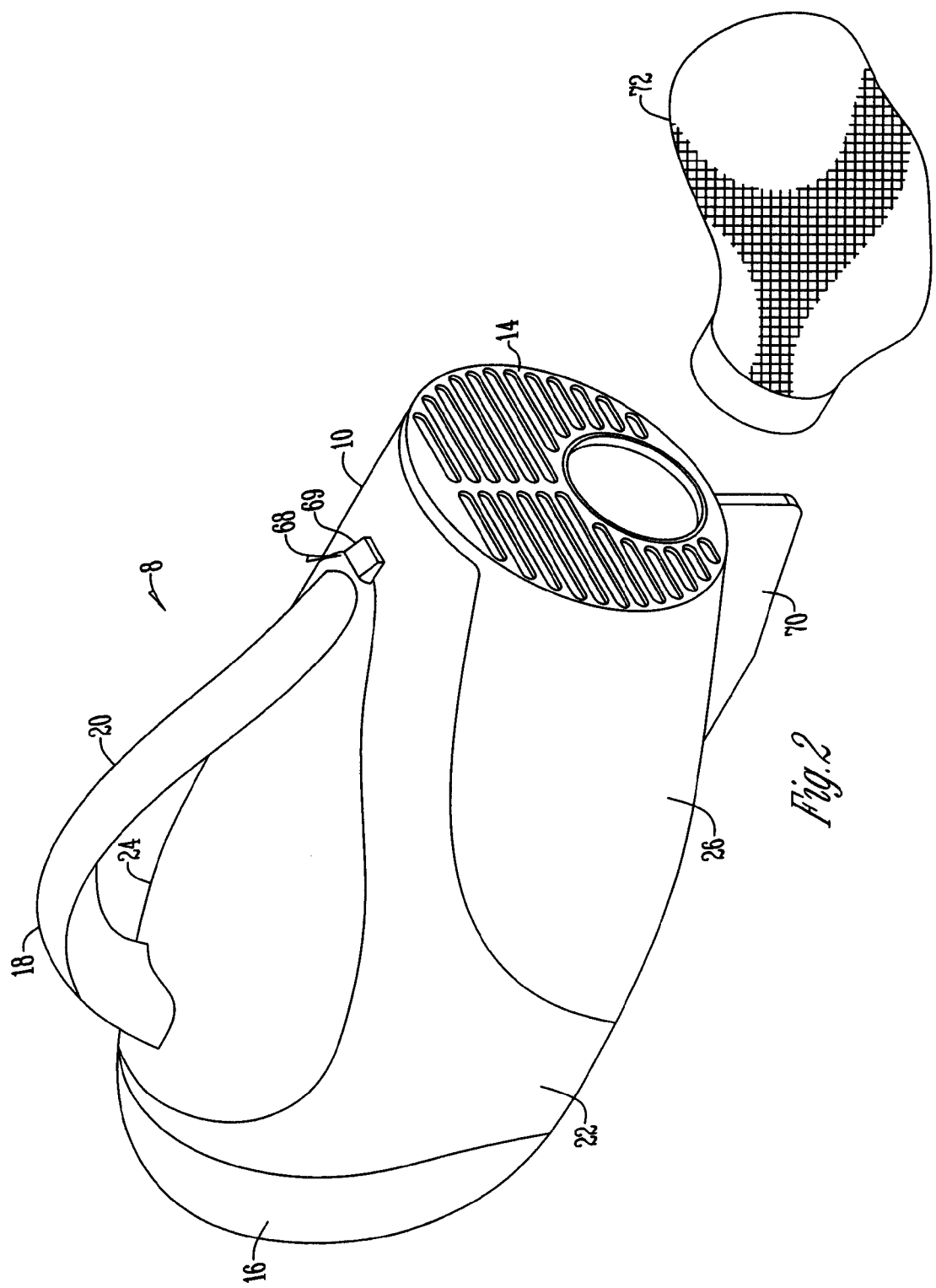
FIG. 2 is a perspective view of a skimmer.
Figure 3:
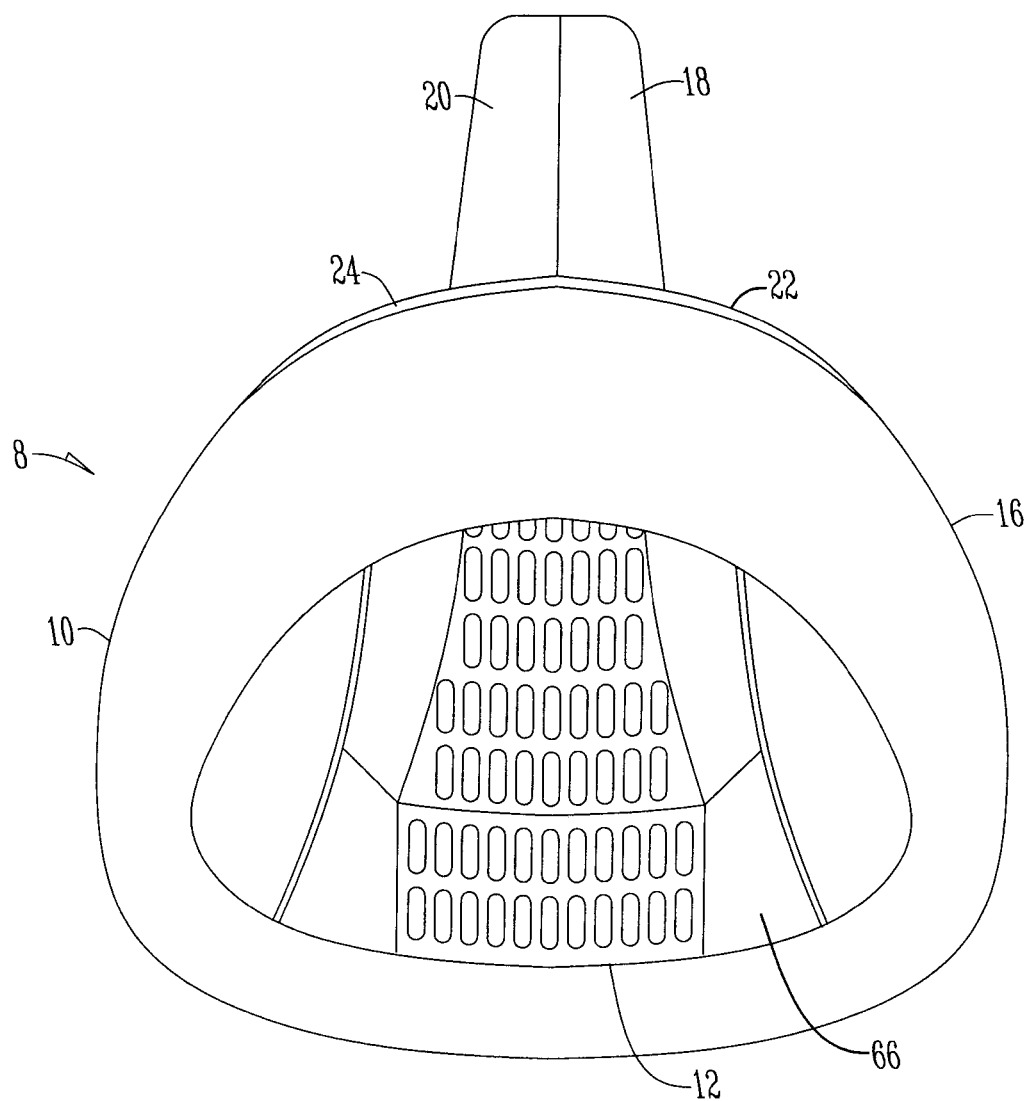
FIG. 3 is a front view of a skimmer.
Figure 4:
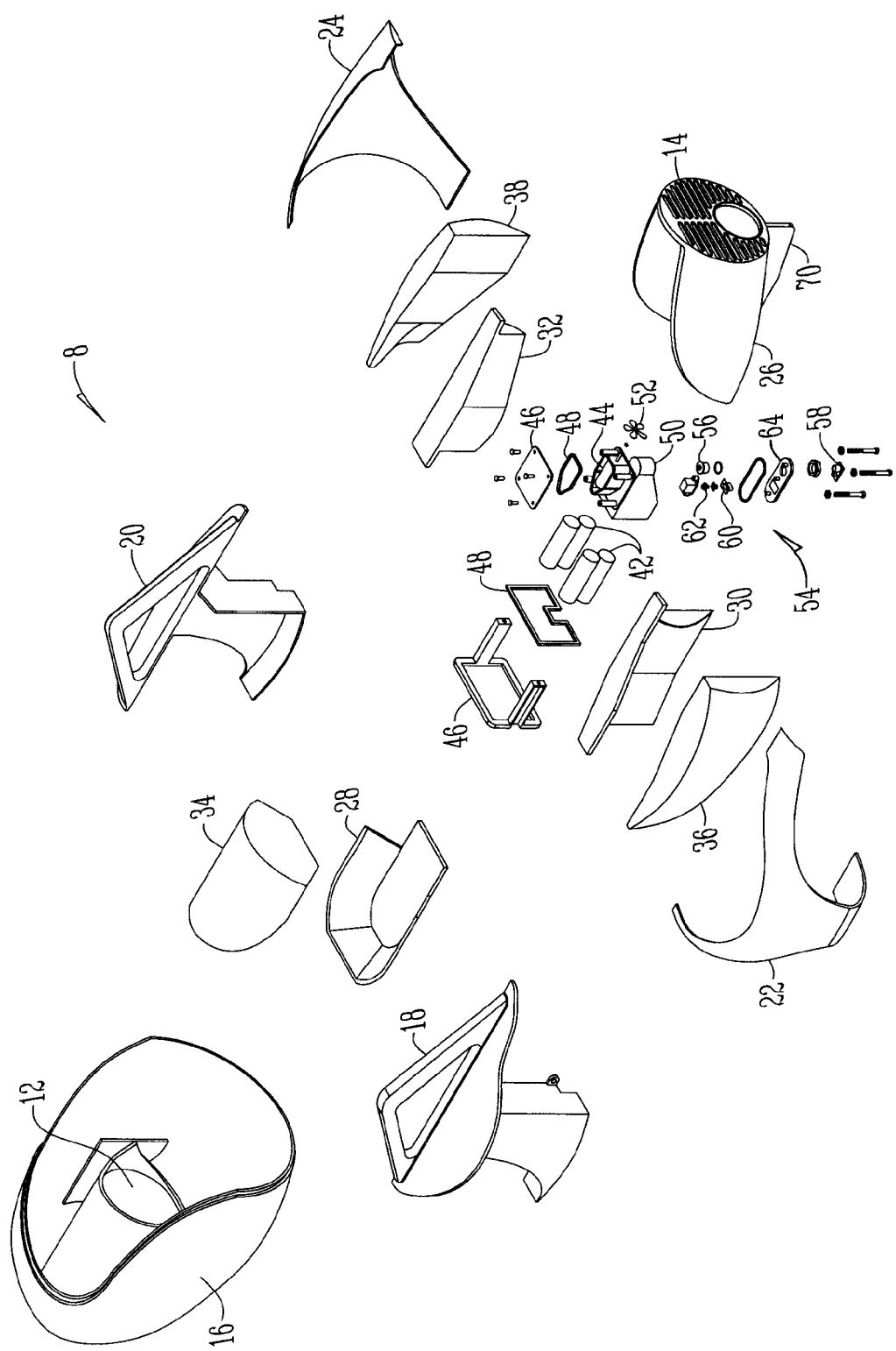
FIG. 4 is an exploded perspective view of a skimmer.

Referring to the figures, the skimmer 8 has a housing 10 with a front opening 12 and a slotted rear opening 14. While the housing 10 is of any shape and size, preferred is a housing comprised of housing sections and float covers. More specifically, the housing has a front section 16 with an opening 12, a first 18 and second 20 handle section, a first 22 and second 24 middle section, and a rear section 26 having a slotted opening 14. Disposed within the housing sections are a plurality of covers including an upper cover 28 and first 30 and second 32 side covers. The housing sections are connected together with screws or the like. The shape of the front section 16 is preferably curved or arcuate to reduce the chance that the skimmer 8 will become stuck against a pool wall or in the corner and instead will spin away and continue to move.

Disposed within the housing 10 is at least one float, and preferably an upper float 34, and first 36 and second 38 side floats which are positioned adjacent the upper cover 28 and first 30 and second 32 side covers respectively. The weight of the skimmer used in conjunction with the floats keeps the skimmer upright and flips the skimmer if it capsizes. Further, disposed within the housing is a battery 42 that is operatively connected to a motor 44. The battery 42 and motor 44 are enclosed within covers 46 and seals 48 and are supported by an inner support 50. Connected to the motor is a propeller 52. Preferably the propeller is tilted with relation to the surface of the water to assist in smooth and free movement of the skimmer 8.

Disposed within the inner support 50 is a switch assembly 54 and a DC jack 56 and plunger 58. The switch assembly 54 has a button 60 connected to a switch 62 with a switch cover 64 positioned over both. The switch assembly 54 is connected to the battery 42 and activates the battery 42 upon engagement.

Removably positioned within the housing 10, through the opening 12 of the front section 16 is a tray 66 for collecting rubbish. The tray is positioned below the edge of the opening 12 so that fluid and rubbish will flow over the edge of the opening 12 such that rubbish is collected in the tray 66. The tray 66 is detachably connected to the housing 10 by a latch or locking mechanism 68. The latching mechanism 68 has a button 69 that extends outwardly from the housing 10 that upon engagement will release the tray 66.

Attached to an extending outwardly from the bottom of the housing 10 is a stabilizing fin 70. The stabilizing fin 70 guides the skimmer 8 as it moves through the water preventing the skimmer 8 from spinning in circles. Also, attached to the housing 10 is a net 72 that provides a secondary filter for trapping debris. Preferably, the net 72 is attached to the rear section 26 of the housing 10 and is made of fine nylon.

In operation, a power source is connected to the DC jack 56 to charge the battery 42. Once charged, the power is supplied to the motor 44 from the battery 42 by activating the button 60 of the switch assembly 54. Once activated, the motor 44 rotates the propeller 52 such that when the skimmer 8 is placed in the water the propeller 52 will move the skimmer across the surface of the water. Preferably, the skimmer 8 does not move straight ahead and instead moves generally and continuously ahead. When the skimmer 8 engages the edge of the pool the skimmer will turn and continue to move generally ahead and continuously.

The width of the front opening 12 is preferably 110-126 mm which is submerged into water. As the skimmer 8 moves ahead water with rubbish flows through the front opening 12 and down into the tray 66 and through the rear slotted opening 14 such that rubbish is collected in the tray 66. When filled, the tray 66 is removed and the rubbish deposited at a remote location.

Thus, a skimmer that at least meets all of the stated objectives has been described.

What is claimed is:

1. A floating skimming device for cleaning the surface of a body of liquid, comprising:
    a housing having a front and a slotted rear opening, a cover, and an inner support;
    a tray disposed within and removably connected to the housing;
    a float disposed within the housing between the cover and the housing; and
    a motor supported by the inner support with an attached propeller disposed within the housing.
2. The device of claim 1 wherein the housing is comprised of a plurality of sections and covers.
3. The device of claim 1 wherein a front of the housing is curved.

4. The device of claim 1 wherein the motor is driven by a rechargeable battery disposed within the housing.

5. The device of claim 1 wherein the propeller is tilted in relation to the surface level of the liquid.

6. The device of claim 1 wherein a fin is attached to and extends outwardly from the housing.

7. The device of claim 1 wherein a net is attached to the housing.

8. The device of claim 7 wherein the net is attached to a rear section of the housing.

9. The device of claim 1 wherein the tray is removably connected to the housing by a locking mechanism.

10. The device of claim 9 wherein the locking mechanism has a button that extends outwardly from the housing.

* * * * *